T. ROBJOHN, dec'd.
SUSAN A. ROBJOHN, Admr'x.
Apparatus for Making Fluted-Ruffles.
No. 6,308. Reissued Feb. 23, 1875.
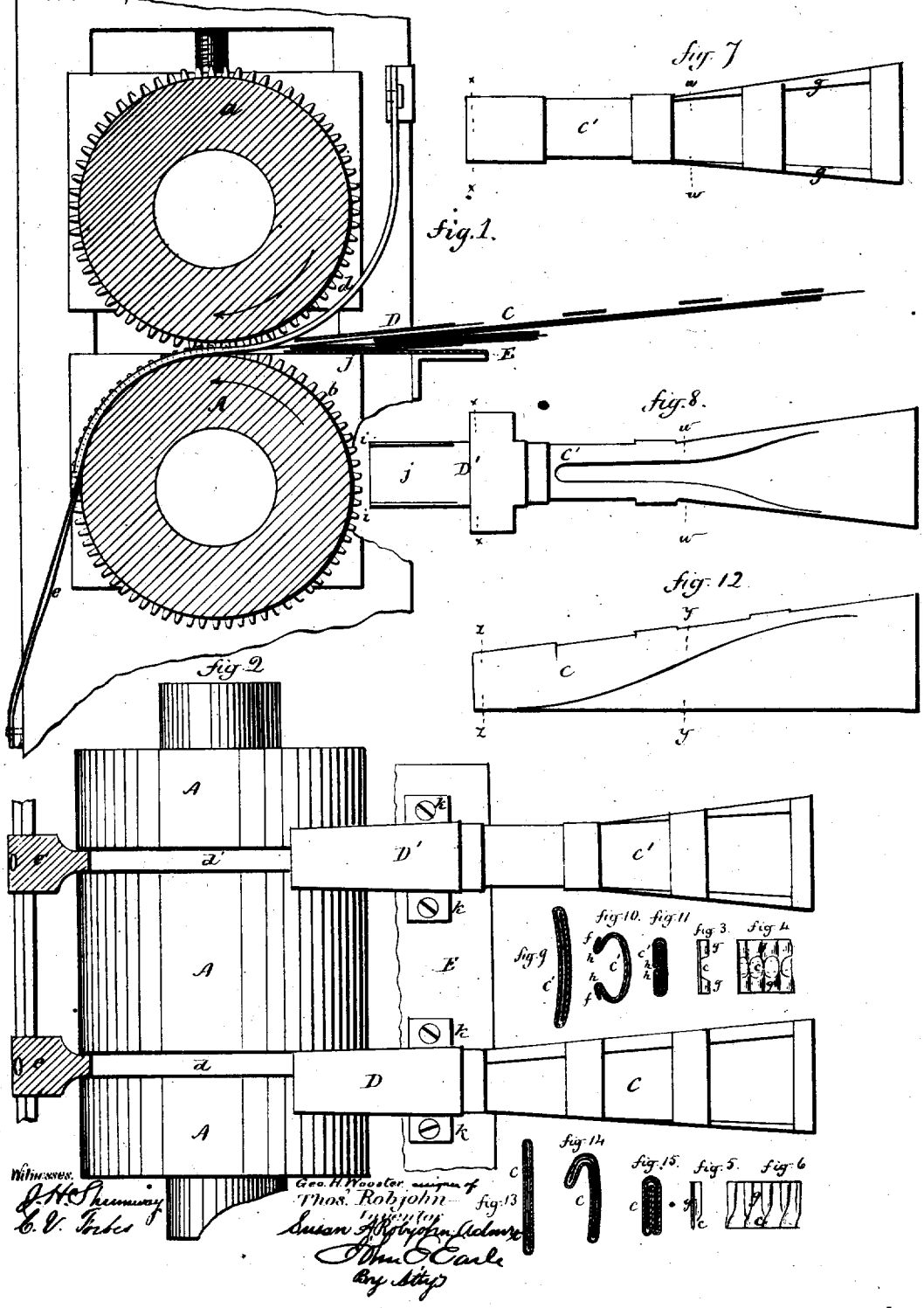
THE GRAPHIC CO. PHOTO-LITH. 39 & 41 PARK PLACE, N.Y.

UNITED STATES PATENT OFFICE.

GEORGE H. WOOSTER, OF NEW YORK, N. Y., ASSIGNEE OF SUSAN A. ROBJOHN, ADMINISTRATRIX OF THOMAS ROBJOHN, DECEASED.

IMPROVEMENT IN APPARATUS FOR MAKING FLUTED RUFFLES.

Specification forming part of Letters Patent No. 42,404, dated April 19, 1864; reissue No 6,308, dated February 23, 1875; application filed November 23, 1874.

*To all whom it may concern:*

Be it known that THOMAS ROBJOHN, now deceased, late of New York, in the county of New York and State of New York, did invent a new Improvement in Apparatus for Folding and Fluting Strips of Fabric; and I do hereby declare the following, when taken in connection with the accompanying drawings and the letters of reference marked thereon, to be a full, clear, and exact description of the same, and which said drawings constitute part of this specification, and represent in—

Figure 1, a vertical section of the principal parts of a fluting-machine, with the improvements; Fig. 2, a horizontal section of the same above the lower fluting-roller; Fig. 3, a transverse section of one kind of ruffle to be made by the machine; Fig. 4, a back view of the same; Fig. 5, a transverse section of another kind of ruffle to be made by the machine; Fig. 6, a face view of the same; Fig. 7, a top view of the folding-guide used in making the ruffle, shown in Figs. 3 and 4; Fig. 8, a bottom view of the said guide and of the socket in which it is held; Fig. 9, an outer end view of the same; Fig. 10, a transverse section of the same in the line *w w* of Figs. 7 and 8; Fig. 11, a transverse section of the same in the line *x x* of Figs. 7 and 8; Fig. 12, a bottom view of the folding-guide used in making the ruffle shown in Figs. 5 and 6; Fig. 13, an outer end view of the same; Fig. 14, a transverse section of the same in the line *y y* of Fig. 12; Fig. 15, a transverse section of the same in the line *z z* of Fig. 12.

Similar letters of reference indicate corresponding parts in the several figures.

This invention relates to an improvement in the method of folding or doubling a strip of fabric longitudinally upon one or both edges, and to the manufacture of fluted ruffling from such folded strips of fabric; and the invention consists in combining with a pair of feeding or drawing rolls a folding-guide, constructed so as to turn or fold one or both edges of a strip of fabric as it is drawn through the said guide by said rolls; also, in the combination of such a folding-guide with such rollers, when the said rollers are fluted to form corresponding flutes in the said folded fabric.

It also consists in the combination, with a fluting-machine and folding-guide, of a flattening-guide, interposed between the said folding-guide and the fluting-rollers.

It further consists in a folding-guide of novel construction for doubling a strip of muslin, silk, or other fabric by turning in both edges toward each other on the same side of the strip.

To enable others skilled in the art to make and use my invention, I will proceed to describe its construction and operation as applied to the manufacture of fluting.

A and *a* are a pair of rolls arranged with their axes parallel, and driven so that their surfaces move together in the usual manner of feeding or drawing rolls, the surface of both here represented as correspondingly fluted, the ribs of one meshing into corresponding grooves of the other, as in common crimping or fluting machines, so that as a fabric is drawn between them it will be correspondingly fluted.

In the manufacture of fluted ruffles it is essential that the flutes be successively flattened at some point, usually at one edge or on an intermediate line. For this purpose the rolls are constructed with corresponding annular grooves, here represented as two, *b b′*, of a depth slightly greater than the depth of the flutes, and in width equal to the extent of flattened surface required.

In these grooves are, respectively, placed the pressers *d d′*, composed of elastic metal attached above, as to a rigid bar, B, and bearing down upon the bottom of the groove in the lower roll. Beneath this presser the strip of fabric is run, and thereby pressed down into the groove of that roll. If, therefore, the strip of fabric be presented to the rolls so that one edge will run in said grooves, then that edge will be flattened, as at *c*, Fig. 6; but if the strip be run so that the grooves will take the center of the strip, then the center will be flattened, as seen in Fig. 4. In each of the grooves is also set a stripper, *e*, by which the fabric is raised from the roll in case it adheres thereto. Two folding guides, C C′, are here represented. The one, C, is constructed in the form of an inclosed channel-way turned transversely, so as to fold or double the strip along the center of its width, as illustrated by the section, Fig. 5, and its form may be readily understood by a comparison of Figs. 12, 13, 14, 15, the transverse section of the strip being shown in broken lines in Figs. 13, 14, 15, by which it will be readily seen how the folding is gradually produced by the drawing of the strip through the guide. This guide in making fluted ruffles is arranged tangentially to the groove *b*, and with respect to the said groove that the two single edges of the strip will pass through the said groove, and be there flattened by the presser *d*, while the doubled edge will be compressed by the rolls as they draw the strip from the folding guide, and the rolls being fluted will give to the thus compressed doubled edge of the strip a corresponding fluted appearance. The guide C′ is constructed to double the strip by turning in both edges toward each other on the same side of the strip. The entrance at one end of this guide is made in the form of a flat tube, or nearly so, of a width equal to the width of the strip to be folded. Commencing at a short distance from this end the upper side of this tube is open for a portion of its length, having only a narrow run, *f f*, on each side, as shown in Figs. 7 and 10, and the sides of the guide are gradually turned under, as shown at *h h* in Figs. 10 and 11, till it assumes at or near the other end the form shown in Fig. 11. The strip in being drawn by the rollers through this guide has its two edges turned in toward each other on the under side, as illustrated by the representation of the transverse section of the strip in broken lines, Figs. 10 and 11, Fig. 11 showing the strip in the form in which it emerges from the guide, and Fig. 10 showing the turning in and doubling about half completed. This guide is so arranged in relation to the grooves *b′* of the rollers as to deliver the doubled strip with the line in which its edges meet opposite to the centers of the said grooves that the doubled strip may be flattened at the meeting of the edges, and the two doubled edges will be compressed by the rolls as they draw the strip from the folding-guide, and the rolls being fluted, will give to both the thus compressed doubled edges a corresponding fluted appearance, as seen at *g g*, Fig. 4.

The two sides of the guide C′, or the one side of the guide C, may be turned in to bring the edges of the doubled strip in the center thereof, or at any distance from the folded edges.

The sockets D D′, into which the folding-guides are inserted, and by which the said guides are held in place, have their outer ends made of a form to correspond with the portions of the guides whence the folded strips issue, and the said sockets have their inner ends, which are very nearly close to the rollers, flattened, and constructed with slits *i i′* and tongues *j* to press and flatten the doubled strips as they pass from the folding-guides to the rollers. The slits *i i′* and tongues are here represented as arranged on the under side of the tube.

What is claimed as the invention of the said THOMAS ROBJOHN is—

1. In combination with a pair of pressing or drawing rolls, a folding-guide, constructed substantially as described, so as to form an inclosed channel-way for guiding and supporting the material, and to turn or fold one or both edges of a strip of fabric as it passes through said guide, and deliver the same to said rolls in such folded condition, the said rolls operating to draw the said strip through said guide, and to press the fold or folds formed by said guides, substantially as described.

2. In combination with a folding-guide, constructed substantially as described, so as to form an inclosed channel-way for guiding and supporting the material, and to turn or fold one or both edges of a strip of fabric, the tongue *j*, substantially as and for the purpose specified.

3. The combination, with a fluting-machine, of a folding-guide, constructed and arranged to deliver a strip of muslin or other fabric to the fluting-rollers, and to fold and double the said strip as it is drawn through it by the said rollers, substantially as and for the purpose herein specified.

4. The combination, with the fluting-machine and the folding guide, of an interposed pressing-guide, substantially as herein specified.

5. The folding-guide, in combination with the socket, which receives and holds in place the said folding-guide, substantially as herein specified.

6. The combination, with a fluting-machine, of the folding-guide C C′, constructed to turn in the two edges of a strip of muslin, or other material, toward each other on the same side of the strip, substantially as herein specified.

GEO. H. WOOSTER,
*Assignee.*

Witnesses:
J. V. ROCKWELL,
C. H. WOOSTER.